United States Patent [19]
Bromley

[11] Patent Number: 5,143,156
[45] Date of Patent: Sep. 1, 1992

[54] ENHANCED OIL RECOVERY USING ORGANIC VAPORS

[75] Inventor: Bruce W. Bromley, Fullerton, Calif.

[73] Assignee: Union Oil Company of California, Los Angeles, Calif.

[21] Appl. No.: 589,097

[22] Filed: Sep. 27, 1990

[51] Int. Cl.$^5$ .................... E21B 43/24; E21B 43/267; E21B 43/40

[52] U.S. Cl. .................... 166/267; 166/303; 166/308

[58] Field of Search ............ 166/271, 272, 280, 266, 166/267, 303, 308; 252/8.551

[56] References Cited

U.S. PATENT DOCUMENTS

| | | | |
|---|---|---|---|
| 2,862,558 | 12/1958 | Dixon | 166/272 |
| 3,739,852 | 6/1973 | Woods et al. | 166/303 |
| 4,022,277 | 5/1977 | Routson | 166/303 X |
| 4,033,411 | 7/1977 | Goins | 166/303 X |
| 4,119,149 | 10/1978 | Wu et al. | 166/272 X |
| 4,127,170 | 11/1978 | Redford | 166/272 X |
| 4,407,367 | 10/1983 | Kydd | 166/303 X |
| 4,450,913 | 5/1984 | Allen et al. | 166/272 X |
| 4,512,405 | 4/1985 | Sweatman et al. | 166/308 X |

OTHER PUBLICATIONS

"Enhanced Oil Recovery, II-Processes and Operations", Donaldson et al. Editors, Table of Contents, pp. 6-9, Elsevier, New York, NY (1989).

Primary Examiner—George A. Suchfield
Attorney, Agent, or Firm—Gregory F. Wirzbicki; Shlomo R. Frieman

[57] ABSTRACT

An enhanced oil recovery process uses a heated organic vapor to reduce the viscosity of a crude oil, especially heavy crude oil. The recovery process is also enhanced because the organic vapor forms a liquid phase miscible with the crude oil, thereby further reducing the viscosity of the crude oil.

10 Claims, 1 Drawing Sheet

PHASE DIAGRAM

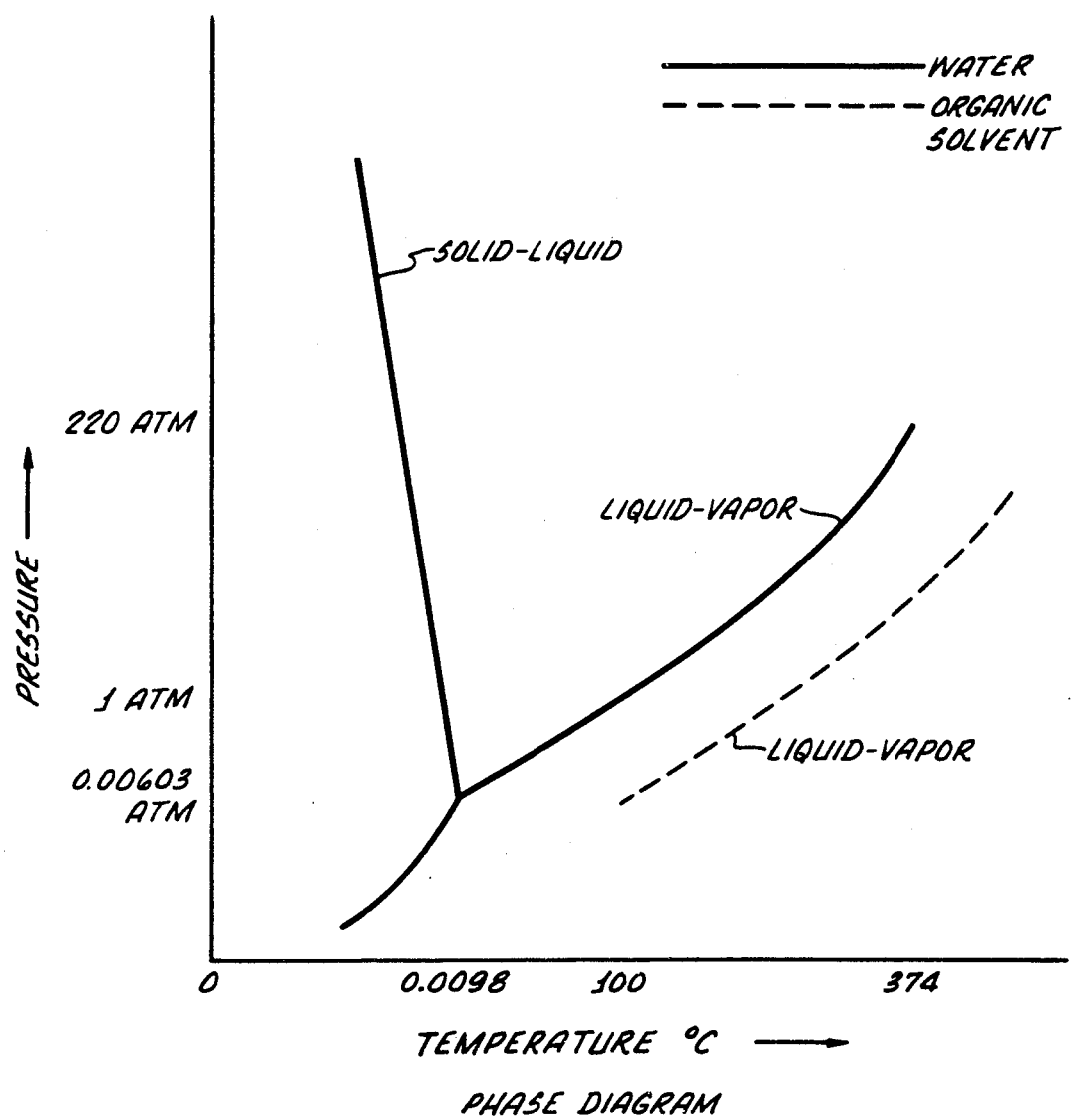
PHASE DIAGRAM

ENHANCED OIL RECOVERY USING ORGANIC VAPORS

BACKGROUND

The present invention relates to enhanced oil recovery techniques and, in particular, to an enhanced oil recovery technique wherein an organic vapor phase is injected into an oil-bearing formation.

There are numerous enhanced oil recovery techniques. Exemplary enhanced oil recovery techniques include chemical processes (e.g., surfactant flooding, polymer flooding, and caustic flooding), thermal processes (e.g., steam stimulation or cyclic steam injection, steam or hot water flooding, and in situ combustion), miscible displacement processes (e.g., miscible solvent flooding, carbon dioxide flooding, and inert gas flooding), and foam displacement (e.g., foam displacement variations of steam or hot water flooding, carbon dioxide flooding, and inert gas flooding).

Each enhanced oil recovery process has its advantages, limitations, and/or disadvantages. For example, steam stimulation or cyclic steam injection employs heat to lower the viscosity of the oil in the formation being treated. However, the temperature achievable by the steam is limited by the pressure of the formation. For heavy crude oil-bearing formations, which are generally within 2,000 feet, and more typically within about 1,000 feet of the ground surface, the steam temperature typically attained at the formation depth where the steam is injected is only about 235° C. at a depth of about 1,000 feet and only about 280° C. at a depth of about 2,000 feet. In addition, the steam condenses in the formation, thereby forming water which is immiscible with the oil and which potentially can be a factor in a host of other problems.

Regarding miscible solvent flooding, the solvent is miscible in the oil and does not have the disadvantages associated with the water formed in the steam stimulation process. However, the solvent is a liquid and, therefore, unlike steam, can only contact a much smaller portion of the formation. Furthermore, the miscible solvent flooding process in not a thermal process and does not employ any significant amount of heat to lower the viscosity of the oil present in the formation.

SUMMARY OF THE INVENTION

The present invention provides an enhanced oil recovery process employing a compound whose vapor phase is capable of achieving a higher temperature than steam at the pressure of the formation and whose liquid phase is miscible with the crude oil in the formation. The process entails the steps of (a) heating an organic compound to above its boiling temperature to form an organic vapor, (b) injecting the organic vapor into at least a portion of an oil-bearing formation, and (c) withdrawing oil from the formation. The organic compound has a boiling point above STP (standard temperature (0° C.) and pressure (1 atmosphere)) and is miscible with crude oil, particularly heavy crude oil. As used in the specification and claims, the term "organic compound" means any compound containing at least one carbon atom; and the term "heavy crude oil" means a crude oil having a °API gravity less than about 20. Generally, heavy crude oils have a °API gravity of about 3 to about 17.

In addition to the enhanced oil recovery process, the invention also provides an enhanced oil recovery system and a composition for use in the enhanced oil recovery process and system. The oil recovery system comprises (a) an oil-bearing formation, (b) a well penetrating at least a portion of the formation, and (c) the organic vapor. The well has an interior bore and one or more ports in fluid communication with the oil-bearing formation and the interior bore. The vapor pressure of the organic vapor within the interior bore of the well is greater than the formation pressure so that the organic vapor moves through the ports in the the well and into the formation.

A composition for use in the enhanced oil recovery process and system comprises the organic vapor and an enhanced oil recovery additive selected from the group consisting of inert gases, hydrocarbon gases that are gases at STP, and oxidizing agents.

DRAWING

The higher temperatures achievable using organic vapors in the enhanced oil recovery process of the present invention as well as other features, aspects, and advantages will become better understood with reference to the following description, appended claims, and accompanying drawing. The sole figure in the drawing is a schematic phase diagram depicting the liquid phase-vapor phase interface for water and an organic compound as a function of pressure and temperature.

DETAILED DESCRIPTION OF THE INVENTION

In the enhanced oil recovery process of the present invention an organic compound having a boiling point above STP is heated to above its boiling temperature and, preferably, below its decomposition temperature, to form an organic vapor. However, because halogenated hydrocarbons tend to cause problems in oil refinery processes, the organic compounds employed in the present invention are preferably substantially devoid of halogen groups.

Within the above guidelines, virtually any organic compound is suitable for use in the process of the present invention. The organic compound can be a solid or a liquid, with the latter being preferred. While pure organic compounds, such as organic solvents, can be used, it is preferred to use less expensive sources such as low viscosity crude oils having a °API gravity of, for example, from about 40 to about 70 and, more specifically, from about 60 to about 70; crude oil petroleum distillates or mixtures of crude oil petroleum distillates having a boiling point within the range of about 30° to about 600° C., but preferably within the range of about 100° to about 250° C.; and oil-base drilling muds.

With respect to the latter, oil-base drilling muds tend to be a disposal problem because of their oil content. As a result of the present invention, however, these drilling muds can now be considered a resource. Specifically, in accordance with one embodiment of the invention, the oil-base drilling mud is heated, thereby driving off the organic content in the form of organic vapors and leaving a substantially oil-free residue. The organic vapors are used in the process of the present invention and the substantially oil-free residue is readily disposed of in an environmentally sound manner.

The organic vapor obtained by heating the organic compound is injected into at least a portion of an oil-bearing formation. Typically, the organic vapor is injected through the interior bore of a well penetrating at least a portion of the oil-bearing formation. The well also has one or more ports in fluid communication with the formation and the interior bore of the well. When the vapor pressure of the organic vapor within the interior bore of the well becomes greater than the formation or hydrostatic pressure, the organic vapor passes from the interior bore, through the ports, and into the formation. As a rule of thumb, the hydrostatic pressure within a formation increases at a rate of about 0.47 psi (which is equivalent to about 0.03 atmosphere) per foot of depth and the lithostatic pressure (i.e., the pressure necessary to fracture a formation) increases at a rate of roughly about 1 psi (which is equivalent to about 0.07 atmosphere) per foot of depth. Although the organic vapor injection pressure is greater than the hydrostatic pressure at the depth where the organic vapor is injected into the formation, it is usually preferred that the organic vapor injection pressure be below the lithostatic pressure at that depth.

However, in certain instances it is actually desirable to fracture the formation. In these instances, the pressure employed in injecting the organic vapor into the formation is greater than or equal to the lithostatic pressure at the depth where the organic vapor is injected. (When used to fracture the formation, the organic vapor is usually injected in combination with an hydraulic fracturing proppant Exemplary proppants include, but are not limited to, sand and sintered aluminum oxide/silicon oxide materials such as intermediate strength proppant and bauxite.)

In order to be an organic vapor at the location where it enters or is injected into the formation, the organic compound must be capable of being in a vapor or gaseous state, for at least some period of time, at the formation pressure. Typically, the organic compound boils, at standard pressure (1 atmosphere), above 100° C., and preferably above about 150° C., and more preferably above 200° C. However, to avoid thermal damage to the formation, the organic compound preferably boils, at atmospheric pressure, at less than about 600° C.

Nevertheless, in certain formations, such as those containing carbonate rock, it is actually advantageous to employ organic vapors at temperatures that thermally decompose portions of the formation. For example, in carbonate rock-containing formations, the thermal degradation of the carbonate rock liberates carbon dioxide. The liberated carbon dioxide further enhances the oil recovery process by reducing the viscosity of the crude oil in the formation.

In general, it is also preferred to heat the organic compound to below its decomposition temperature. Nonetheless, heating the organic compound to above its decomposition temperature is not per se detrimental because, under such circumstances, the organic compound merely forms lower molecular weight hydrocarbons which typically are also miscible in the crude oil.

Numerous organic compounds and mixtures of organic compounds, usually in liquid form, can be used in the invention as the source of the organic vapor. The particular organic liquid or compound chosen for use in a given enhanced oil recovery process application in accordance with the present invention is tailorable for the pressure conditions within the particular oil-bearing formation being treated as well as for where within the formation it is desired to condense the organic vapor to form its organic liquid phase. As a rule of thumb, the further from the well where the organic vapor is injected into the formation to the location where the organic vapor is to condense to form its liquid phase, the higher the required boiling temperature of the organic compound at atmospheric pressure.

Optionally, the organic vapor is injected into the formation in combination with another enhanced oil recovery additive. Typical enhanced oil recovery additives include, but are not limited to, inert gases (e.g., nitrogen, carbon dioxide, and mixtures thereof), hydrocarbon gases that are gases at STP (e.g., methane, ethane, propane, butane, and mixtures thereof), and oxidizing agents (e.g., oxygen and organic peroxides).

The oil is withdrawn from the formation using any technique known to those skilled in the art. Exemplary of such techniques are the classical drive and huff-and-puff processes.

The organic vapor enhanced oil recovery technique of the present invention offers several advantages. First, the flexibility of the present enhanced oil recovery technique provided by the ability to select an organic compound having a desired temperature at formation pressure as well as the ability to select the location where the organic vapor phase condenses to form its liquid phase is a marked improvement over steam injection techniques where the boiling temperature of water and the steam (vapor phase)/water (liquid phase) transition location are essentially fixed. In addition, as illustrated in the schematic drawing, for any given formation pressure, higher vapor temperatures are obtainable using the organic vapor enhanced oil recovery process than are possible with the steam injection techniques. These higher temperatures are desirable for purposes of either (a) thermally reducing the viscosity of the crude oil and/or (b) lowering crude oil viscosity by the in situ formation of carbon dioxide as a result of thermal degradation of material, such as carbonate rock, indigenous to the formation being treated and/or (c) thermally degrading the crude oil in the formation to lower viscosity, lower molecular weight hydrocarbons.

Furthermore, as noted above, the organic vapor is preferably miscible with the crude oil in the formation. Therefore, instead of the liquid phase being a possible source of problems as in the steam injection process, the liquid phase of the organic vapor enhanced oil recovery process additionally aids in the oil recovery process by further helping to reduce the viscosity of the crude oil. Also, since an organic vapor enters the formation in the present invention, a greater volume of the formation or reservoir is exposed to the crude oil-miscible organic material.

EXAMPLES

The following examples illustrate enhanced oil recovery techniques embodying features of the claimed invention.

EXAMPLE 1

Huff-and-Puff Process

Gas condensate crude oil having a °API gravity of about 50 to about 60 is produced from a portion of an oil-bearing formation located at about 10,000 to about 12,000 feet below the surface of the ground. The gas condensate is heated to a temperature of about 350° to about 600° C. at about 30 to about 50 atmospheres to form an organic vapor. The organic vapor is then pumped for about 5 to about 10 days through a well into a heavy crude oil-bearing formation located about 1,000 to about 1,500 feet below the ground surface. The well is shut in for about 5 to about 10 days. After the shut in period, additional heavy crude oil is extracted from the same well.

EXAMPLE 2

Drive Process

A crude oil distillate fraction having an atmospheric boiling point within the range of about 175° to about 275° C. is piped from a nearby refinery to an oil field. At the oil field, the distillate is heated to a temperature of about 260° to about 400° C. and under a pressure of about 30 to about 50 atmospheres to form an organic vapor. The organic vapor is pumped for about 10 to about 30 days through an injection well into a heavy crude oil-bearing formation positioned about 1,000 to about 1,500 feet under the surface of the ground.

At the end of this initial injection period, the crude oil distillate fraction being piped from the refinery to the oil field is changed to a higher boiling crude oil distillate fraction having an atmospheric boiling point of about 200° to about 300° C. This higher boiling fraction is then heated, at a pressure of about 30 to about 50 atmospheres, to about 300° to about 450° C., and the resulting vapor is pumped into the injection well for about 30 to about 60 days.

The above process is repeated, taking successively higher and higher boiling fraction from the refinery, heating them to successively higher temperatures to form an organic vapor, and injecting the formed vapor into the injection well until at least one of the surrounding production wells begins to recover heavy crude oil. Once one or more of the production wells begin to increase their heavy crude oil output, a lower boiling fraction of the crude oil distillate is again taken from the refinery to shorten or contract the distance from the injection well into the formation where the organic vapor condenses to form its liquid phase. This contraction is intended to recover additional heavy crude oil remaining in the formation after the initial procedure.

Although the present invention has been described in considerable detail with reference to some preferred versions, other versions are possible. For example, other enhanced oil recovery additives, such as foams and surfactants, can be employed in the enhanced oil recovery procedure of the present invention. Therefore, the spirit and scope of the appended claims should not necessarily be limited to the description of the preferred versions contained herein.

What is claimed is:

1. An enhanced oil recovery process comprising the steps of:
   (a) recovering a low viscosity oil from a low viscosity oil-containing formation,
   (b) heating at least the low viscosity oil recovered in step (a) to above its boiling temperature and below its decomposition temperature to form an organic vapor, the recovered low viscosity oil having a boiling point above standard temperature and pressure (STP) and being miscible with crude oil having an API gravity less than about 20,
   (c) injecting the organic vapor into at least a portion of an oil-bearing formation, and
   (d) withdrawing oil from the formation.

2. The process of claim 1 wherein step (c) includes the steps of:
   (i) injecting the organic vapor into a well penetrating at least a portion of the oil-bearing formation, and
   (ii) forcing the organic vapor from the well into at least a portion of the oil-bearing formation, wherein the low viscosity oil recovered in step (a) boils above 100° C. and atmospheric pressure.

3. The process of claim 1 wherein step (c) includes the steps of:
   (i) injecting the organic vapor into a well penetrating at least a portion of the oil-bearing formation, and
   (ii) forcing the organic vapor from the well into at least a portion of the oil-bearing formation, wherein the low viscosity oil recovered in step (a) boils above about 150° C. and atmospheric pressure.

4. The process of claim 1 wherein step (c) includes the steps of:
   (i) injecting the organic vapor into a well penetrating at least a portion of the oil-bearing formation, and
   (ii) forcing the organic vapor from the well into at least a portion of the oil-bearing formation, wherein the low viscosity oil recovered in step (a) boils above about 200° C. and atmospheric pressure.

5. The process of claim 1 further comprising the step of condensing at least a portion of the organic vapor outside the well bore to form an organic liquid in the formation.

6. The process of claim 1 where step (c) includes the step of injecting a mixture comprising the organic vapor and an enhanced oil recovery additive selected from the group consisting of inert gases, hydrocarbon gases that are gases at STP, and oxidizing agents.

7. The process of claim 1 wherein step (c) includes the step of injecting the organic vapor into the formation at a pressure greater than the hydraulic pressure and less than the lithostatic pressure at the formation depth where the organic vapor is injected.

8. The process of claim 1 wherein step (c) includes the step of injecting the organic vapor into the formation at a pressure greater than the lithostatic pressure at the formation depth where the organic vapor is injected.

9. The process of claim 8 further comprising the step of fracturing the formation.

10. The process of claim 8 wherein step (c) includes the step of injecting into the formation a composition comprising the organic vapor and an hydraulic fracturing proppant.

* * * * *